July 18, 1939.   D. HOWARTH   2,166,407
REEL SEAT
Filed Sept. 13, 1937   2 Sheets-Sheet 1
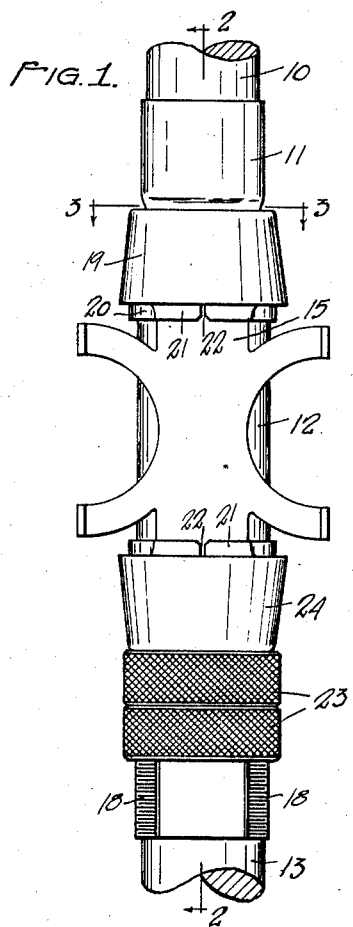
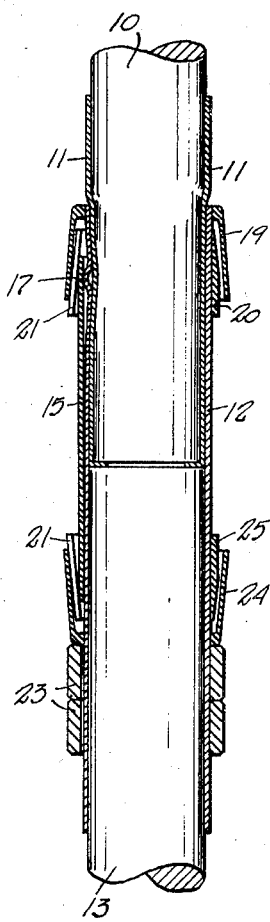
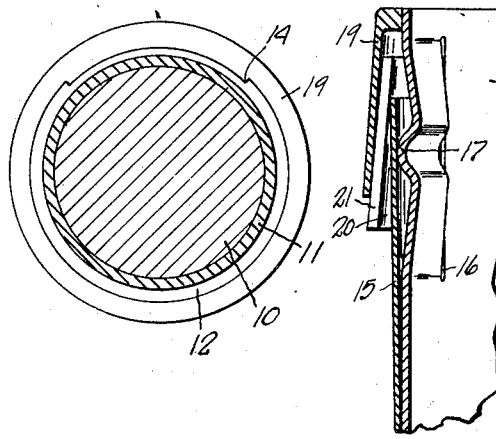
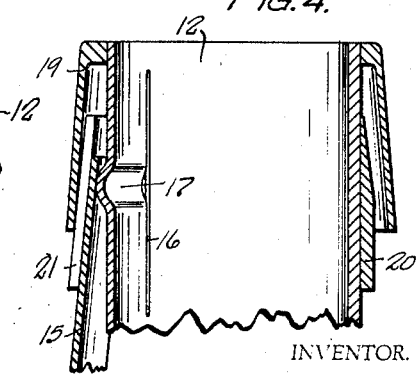
INVENTOR.
DAVID HOWARTH.
BY Oltsch & Knoblock
ATTORNEYS.

July 18, 1939.                    D. HOWARTH                    2,166,407
                                   REEL SEAT
                            Filed Sept. 13, 1937                2 Sheets-Sheet 2
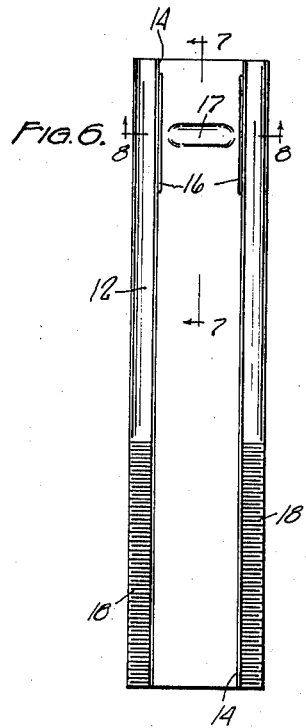
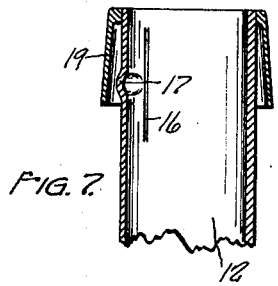
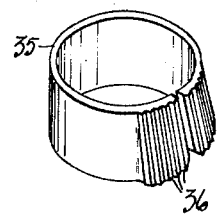
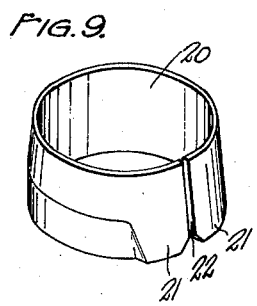
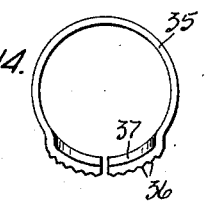
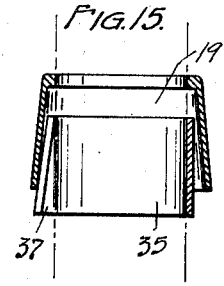
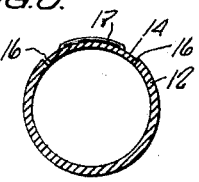
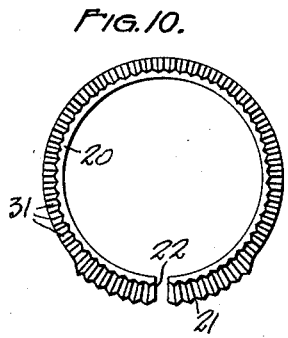
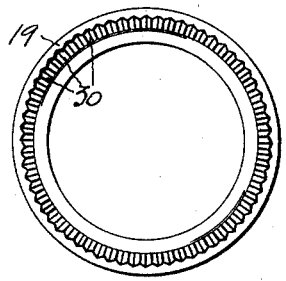
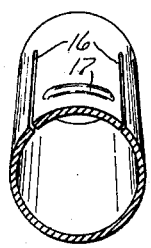
INVENTOR.
DAVID HOWARTH
BY
ATTORNEYS.

Patented July 18, 1939

2,166,407

UNITED STATES PATENT OFFICE 2,166,407

REEL SEAT

David Howarth, Glendale, Calif., assignor to South Bend Bait Company, South Bend, Ind., a corporation of Indiana Application September 13, 1937, Serial No. 163,600

8 Claims. (Cl. 43—22)

This invention relates to reel seats, and particularly to a device for mounting a fishing reel upon a fishing rod.

Heretofore various types of reel seats have been provided by means of which a fishing reel may be mounted on a fishing rod, but most of these involve a construction wherein a sleeve or tube encircles the butt end of a rod with a fit which, while snug, nevertheless provides no means for locking or effectively preventing relative rotation of the rod and sleeve. The rod carries line guides through which the line from the reel extends, and it is obviously desirable that the rod and reel seat be so relatively positioned at all times that these line guides on the rod are aligned with the reel carried by the reel seat.

Previous reel seats have also failed to provide means to effectively hold the base plate of a reel thereon in a manner preventing lateral play thereof in all instances. The base plates of reels of different manufacturers vary in dimension, and particularly in width, and such variations, while slight, are sufficient with previous reel seat constructions to permit lateral play of the reel base on the reel seat. Thus, though the barrel of a reel seat may include a reel base receiving slot, said slot must be of a width to receive all reel bases and hence is too large for some reel bases with the result that the reel is not effectively anchored on the reel seat.

It is, therefore, the primary object of this invention to provide novel means for effectively locking a reel seat and fishing rod against rotation with relation to each other.

A further object is to provide a novel device of this character by which the operation of locking the fishing reel on the reel seat will additionally serve to lock the reel seat in stationary relation on the rod.

A further object is to provide a reel seat having a sleeve provided with spaced parallel longitudinal slits defining a portion against which the base plate of a reel is adapted to seat, which portion includes a transverse outward off-set intermediate its ends whereby pressure of the base plate of the reel thereagainst serves to press said portion inwardly into positive locking engagement with the rod on which said sleeve is mounted.

A further object is to provide a reel seat having a split ring firmly gripping a reel base, and a tapered socket for pressing said ring and reel base inwardly upon a reel seat barrel, with means at interengaging portions thereof for locking said parts against relative rotation.

A further object is to provide a reel seat with a pair of telescoping parts, one of which is non-rotatable, and the other of which firmly grips a reel base, which interfit and have serrations at the interengaging portions of the peripheries thereof to hold said parts and said reel against rotative movement or lateral play.

Other objects will be apparent from the description and appended claims.

In the drawings:

Fig. 1 is a fragmentary elevational view of a fishing rod illustrating the manner in which my device is mounted on the rod and locks a reel base to place.

Fig. 2 is a fragmentary longitudinal sectional view taken on line 2—2 of Fig. 1.

Fig. 3 is a transverse sectional view taken on line 3—3 of Fig. 1.

Fig. 4 is an enlarged fragmentary longitudinal sectional view taken on line 2—2 of Fig. 1 and illustrating the manner in which a reel base is applied.

Fig. 5 is a view similar to Fig. 4, but illustrating the manner in which the device is inwardly pressed to effect a locking engagement of reel seat and rod.

Fig. 6 is an elevational view of the sleeve of the reel seat.

Fig. 7 is a fragmentary longitudinal sectional view taken on line 7—7 of Fig. 6.

Fig. 8 is a transverse sectional view taken on line 8—8 of Fig. 6.

Fig. 9 is a perspective view of an adapter.

Fig. 10 is an end view of an adapter provided with peripheral exterior serrations.

Fig. 11 is an end view of a socket member provided with peripheral interior serrations.

Fig. 12 is a transverse sectional view similar to Fig. 8 and illustrating a modified sleeve construction.

Fig. 13 is a perspective view of a modified adapter construction.

Fig. 14 is an end view of the adapter shown in Fig. 13.

Fig. 15 is a longitudinal sectional view illustrating the cooperative relation of said adapter with its socket.

Referring to the drawings, the numeral 10 designates a fishing rod mounting at one end a tubular metal ferrule 11 which fits within one end portion of the metal sleeve 12 of a reel seat. A handle 13 for the rod fits within the opposite end portion of sleeve 12.

The sleeve 12 is preferably provided with a longitudinally extending exterior recess or slot 14 of a width equal approximately to one-quarter of the circumferential dimension of the sleeve, which slot serves to receive the elongated base plate 15 of a fishing reel therein. Adjacent the sides of slot 14, and preferably in spaced relation to one end of sleeve 12, said sleeve is provided with a pair of opposed, parallel, longitudinally extending, narrow slits 16 of a length preferably not exceeding one-third the length of the sleeve 12. These slits define an integral web portion at the reduced thickness or slotted portion of sleeve 12 against which one end of reel plate 15 seats, and said portion is provided with a transverse outwardly offset or ridged portion 17 intermediate its ends. At the end of sleeve 12 opposite slits 16, the large diameter portion thereof is provided with screw threads 18 interrupted by slot 14.

At the slitted end of the sleeve 12 is fixedly secured the reduced end of a hollow socket member 19 of frusto-conical shape which encircles said sleeve and is outwardly spaced therefrom for the major portion of its length. Socket 19 is of a length whereby its inner end preferably projects slightly beyond sleeve off-set 17, i. e., whereby said off-set lies between the planes of the opposed ends of said socket. An adapter 20 in the nature of a split ring slidably encircles sleeve 12 and is adapted to fit within socket 19. The inner periphery of adapter 20 is of cylindrical shape for the major portion of its circumference, with the remaining portion thereof of a width approximately equal to the width of slot 14 outwardly off-set relative to said cylindrical portion and tapering from the inner to the outer end thereof, said interior tapered portion preferably being longitudinally centered by the split of said adapter ring. The adapter is thin at the inner end thereof, and is of tapered outer peripheral contour for approximately one-half its length, the remainder of said outer periphery being of cylindrical shape with the exception of the portion opposite the tapered interior peripheral portion which is tapered exteriorly throughout its length. The adapter 20 is, therefore, of substantially wedge shape in longitudinal section for the major portion of its circumference and is provided with a tapered portion 21 substantially flat in longitudinal section centered by slit 22 thereof. The angle at which the exterior periphery of adapter 20 tapers relative to its axis is preferably slightly greater than the similar angle of taper of the interior periphery of socket member 19.

A pair of knurled lock nuts 23 are threaded on screw threads 18 of sleeve 12, and against the inner of these nuts bears a tapered socket member 24 of the same construction as socket 19 but slidable on said sleeve. Within this socket member is adapted to fit an adapter ring 25 slidably encircling sleeve 12 and preferably identical to adapter ring 20. The reduced end of socket 24 abuts lock nuts 23, and said socket and its interfitting adapter 25 are, therefore, in reversed or opposed relation to the opposite socket 19 and adapter 20.

In use, it being understood that the rod 10 and handle 13 are in operative relation to sleeve 12, one end of the base plate 15 of the fishing reel is inserted within adapter 20 at the tapered portion 21 thereof. During this application reel plate 15, adapter 20 is preferably positioned in socket 19 and tapered portion 21 thereof is positioned to overlie slot 14 of sleeve 12. The end of said reel plate 15 rides over off-set 17 of the sleeve, whereby, as said plate 15 is urged into tight fitting relation in adapter 20, it assumes an angular position with respect to the sleeve 12 as illustrated in Fig. 4. The opposite end of reel plate 15 is then urged inwardly against slot 14 of sleeve 12, and adapter 25 is slid thereover with a tight fit followed by sliding of socket 24 over the adapter. The nuts 23 are then tightened to exert lengthwise pressure on the parts for the purpose of urging each adapter tightly into its socket. It will be seen that the application of the adapters tightly over the ends of reel plate 15 at off-set portion 21 thereof in the first step of the assembly of the parts may continue, by virtue of the split 22, until the side edges of the reel plate bear upon the sides of off-set portions 21 whereby said plate ends are firmly anchored in said adapters. Then, as the lengthwise tightening action occurs to press the adapters toward the small diameter ends of their respective tapered sockets, said sockets bear upon the exterior faces of adapter off-sets 21 to press the adapters and plate 15 radially inwardly against sleeve 12. It will be observed, also, that such pressure is transmitted to the portion of the sleeve defined by slits 16 through the interengaging of off-set 17 with the plate. Consequently, said split-defined sleeve portion is inwardly pressed upon the ferrule 11 of rod 10 to effect a positive frictional grip of the sleeve on said ferrule and rod at that point. In other words, the one operation of tightening nuts 23 serves both to clamp the reel plate on the reel seat, and to lock the reel seat sleeve and rod to positively prevent relative rotation thereof.

It will be seen that, by spacing slits 16 approximately one-quarter of the circumference of sleeve 12, the major portion of the sleeve at that point is of sufficient extent to form a solid bearing or abutment for the adapter 20, so that all stress is exerted at the slotted sleeve portion defined by said slits. Furthermore, the off-set 17 serves as a center of thrust for the compressive action of the adapter, which facilitates translation of the endwise thrust exerted by nuts 23 into radial thrust upon the sleeve to effect the sleeve distortion required for locking the sleeve on the rod. The endwise thrust exerted by nuts 23 is obviously great and tends to wedge the adapters tightly in their sockets. However, the difference in taper of these parts limits this wedging action to a line engagement usually limited in extent to the width of adapter off-set 21, so that these parts may readily be separated to permit quick and easy release of a reel from the reel seat.

While I prefer to use the sleeve construction having slot 14 for reception of reel plate 15, the presence of such slot is not essential. Thus I have illustrated, in Fig. 12, a construction wherein the exterior sleeve surface is truly cylindrical and the sleeve has the slits 16 therein and the outward off-set 17 in the same relation to the slits as above described. This construction may be desirable in some instances, as where the expense of forming a longitudinal reel plate receiving recess or slot as aforesaid is objectionable.

For the purpose of holding the plate 15 directly upon the off-set 17 and between slits 16 and for holding the reel plate against lateral play relative to sleeve 12 in the unslotted sleeve construction, and for preventing play of the parts due to excessive width of slot 14 in the preferred sleeve construction, I may employ the construction illustrated in Figs. 10 and 11 in the nature of longitudinally extending serrations 30 formed in the inner periphery of the sockets 19 and 24, and similar serrations 31 on the exterior of adapters 20 and 25. It will be obvious that when these serrations interfit, the adapter is held against rotation in the socket and in turn holds plate 15 stationary through the medium of plate engaging portion 21 thereof. It is preferred that the serrations on the adapter shall be limited to the off-set portion 21 thereof for simplicity, inasmuch as the contact of the adapter with the socket occurs mainly at that point; however, said serrations may extend entirely circumferentially of both adapter and socket if desired or necessary.

In Figs. 13 to 15 I have illustrated a simplified and comparatively inexpensive split adapter ring 35 which may be stamped from a metal strap of uniform flat cross sectional shape and dimension, and having serrations 36 on the exterior face of the off-set reel seat engaging portion 37 thereof.

I claim:

1. In a reel seat, a hollow metal cylindrical member having a reduced thickness portion defining a longitudinal slot adapted to receive a reel base, said member having parallel longitudinal slits adjacent one end to provide the member with an integral resilient portion at said slot, said resilient portion having a transverse outwardly off-set portion intermediate its ends, a tapered socket encircling said member at said off-set, a tapered split ring encircling said member and adapted to fit into said socket and overlie said reel base, and means for urging said ring endwise toward the small diameter end of said socket to lock said reel base between said ring and member, and press said reel base radially inwardly against said off-set to distort the resilient portion of said member.

2. In a reel seat, a metal sleeve having a reduced thickness portion defining a longitudinal slot adapted to receive a reel base, the slotted portion of said sleeve having opposed longitudinal slits to define an integral resilient portion, said resilient portion having a transverse outwardly off-set portion intemediate its ends, and means adjacent said off-set for overlying and clamping said reel base on said sleeve, said means serving to apply radially inwardly pressure on said reel base at said off-set to distort the resilient portion of said sleeve.

3. In a reel seat, a metal sleeve having spaced opposed longitudinal slits therein to define an integral resilient portion, said resilient portion having a transverse outward off-set intermediate its ends, and means adjacent said off-set for overlying and locking a reel base on said sleeve in overlying relation to said resilient portion and off-set, said means serving to apply radially inward pressure on said reel base at said off-set to distort the resilient portion of said sleeve.

4. In a reel seat, a metal sleeve having spaced opposed longitudinal slits therein to define an integral resilient portion, a transverse outward projection intermediate the ends of said resilient portion, a reel base overlying said resilient portion and bearing on said projection, and means for locking said reel base on said sleeve with a clamping action having a radial component for pressing said reel base against said projection to distort said resilient sleeve portion.

5. In a reel seat, a metal sleeve having spaced opposed longitudinal slits therein to define an integral resilient portion, a transverse outward projection intermediate the ends of said resilient portion, a reel base overlying said resilient portion and bearing on said projection, and means for locking said reel base on said member including a split ring encircling said sleeve and having an outwardly off-set portion divided by said split and overlying said base, and means pressing against said off-set whereby said reel base is pressed inwardly against said projection to distort said resilient portion.

6. In a reel mounting, a metal sleeve having a longitudinal portion of reduced thickness, a pair of opposed longitudinal slits at said reduced thickness portion and spaced from the sleeve ends to constitute an integral resilient sleeve portion, and a transversely extending outwardly protruding portion intermediate the ends of said slits adapted to receive pressure for distorting said resilient portion.

7. In a reel seat, a cylindrical member against which the base of a reel is adapted to seat, a tapered socket secured to and encircling said member, and a split locking ring encircling said member and fitting into said socket, said ring having a tapered off-set divided by said split and solidly seating on said base, the interengaging peripheries of said socket and ring having longitudinal serrations for at least a portion of the circumstance of each and adapted to interfit to lock said parts against relative rotation, said ring being longitudinally slidable into said socket.

8. In a reel seat, a metal sleeve having a pair of opposed slits defining an integral resilient portion against which a reel base is adapted to seat, an outward projection in said resilient portion, a tapered socket encircling said sleeve, a tapered split ring fitting within said socket and having an interior off-set receiving said reel base, said ring being adapted to press said base inwardly on said projection to flex said resilient portion when wedged in said socket, and means for holding said socket and reel base against rotation on said sleeve.

DAVID HOWARTH.

CERTIFICATE OF CORRECTION.

Patent No. 2,166,407.  July 18, 1939.

DAVID HOWARTH.

It is hereby certified that error appears in the printed specification of the above numbered patent requiring correction as follows: Page 3, second column, line 40, claim 7, for the word "circumstance" read circumference; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.